United States Patent
Matskewich et al.

(10) Patent No.: US 7,821,524 B2
(45) Date of Patent: Oct. 26, 2010

(54) ADAPTIVE CONTEXTUAL FILTERING

(75) Inventors: Tanya Matskewich, Kirkland, WA (US); Geraldine Wade, Redmond, WA (US); Gregory C. Hitchcock, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 558 days.

(21) Appl. No.: 11/768,827

(22) Filed: Jun. 26, 2007

(65) Prior Publication Data

US 2009/0009529 A1 Jan. 8, 2009

(51) Int. Cl.
G09G 5/24 (2006.01)

(52) U.S. Cl. ...................... 345/619; 348/448

(58) Field of Classification Search ................ 345/619; 348/448
See application file for complete search history.

(56) References Cited

U.S. PATENT DOCUMENTS

| | | | | |
|---|---|---|---|---|
| 5,113,494 A * | 5/1992 | Menendez et al. | ........... | 345/502 |
| 5,251,268 A * | 10/1993 | Colley et al. | ................. | 382/156 |
| 5,555,360 A * | 9/1996 | Kumazaki et al. | ........... | 345/443 |
| 5,647,010 A * | 7/1997 | Okubo et al. | ................ | 382/100 |
| 5,687,006 A * | 11/1997 | Namizuka et al. | ........... | 358/462 |
| 5,721,791 A * | 2/1998 | Maeda et al. | ................ | 382/253 |
| 5,729,704 A * | 3/1998 | Stone et al. | .................. | 715/804 |
| 5,768,417 A * | 6/1998 | Errico et al. | ................ | 382/186 |
| 5,841,437 A * | 11/1998 | Fishkin et al. | ............... | 345/619 |
| 5,854,855 A * | 12/1998 | Errico et al. | ................ | 382/187 |
| 5,914,748 A * | 6/1999 | Parulski et al. | ............... | 348/239 |
| 6,324,309 B1 * | 11/2001 | Tokuyama et al. | .......... | 382/300 |
| 6,331,859 B1 * | 12/2001 | Crinon | ........................ | 345/619 |
| 6,359,703 B1 * | 3/2002 | Yabe | ........................... | 358/1.9 |
| 6,411,741 B1 * | 6/2002 | Hamamura et al. | ......... | 382/254 |
| 6,462,750 B1 * | 10/2002 | Plow et al. | ................... | 345/619 |
| 6,738,526 B1 * | 5/2004 | Betrisey et al. | ............. | 382/260 |
| 6,891,550 B1 * | 5/2005 | Nolan | ......................... | 345/619 |
| 6,956,576 B1 * | 10/2005 | Deering et al. | .............. | 345/475 |
| 7,130,480 B2 * | 10/2006 | Betrisey et al. | ............. | 382/260 |
| 7,184,058 B2 * | 2/2007 | MacInnis et al. | ........... | 345/600 |
| 7,242,413 B2 * | 7/2007 | Chu et al. | .................... | 345/619 |
| 7,369,284 B1 * | 5/2008 | Inuzuka et al. | .............. | 358/512 |
| 7,423,793 B2 * | 9/2008 | Shikatani | .................... | 359/107 |
| 7,471,844 B2 * | 12/2008 | Tadas | ......................... | 382/260 |
| 7,474,308 B2 * | 1/2009 | Deering | ...................... | 345/419 |
| 7,508,448 B1 * | 3/2009 | Lew et al. | .................... | 348/448 |
| 7,532,216 B2 * | 5/2009 | Wendel et al. | .............. | 345/472 |
| 7,551,182 B2 * | 6/2009 | Bethune et al. | ............. | 345/619 |
| 7,617,267 B1 * | 11/2009 | Young | ........................ | 708/300 |
| 2001/0016065 A1 * | 8/2001 | Yamamoto et al. | .......... | 382/173 |
| 2002/0093685 A1 * | 7/2002 | Suzuki | ....................... | 358/3.06 |
| 2002/0131642 A1 * | 9/2002 | Lee et al. | .................... | 382/220 |
| 2003/0107586 A1 * | 6/2003 | Takiguchi et al. | ........... | 345/629 |
| 2003/0235341 A1 * | 12/2003 | Gokturk et al. | ............. | 382/243 |
| 2004/0032906 A1 * | 2/2004 | Lillig | ..................... | 375/240.08 |
| 2004/0141645 A1 * | 7/2004 | Lee et al. | .................... | 382/182 |
| 2004/0151398 A1 * | 8/2004 | Betrisey et al. | ............. | 382/260 |

(Continued)

*Primary Examiner*—Javid A Amini
(74) *Attorney, Agent, or Firm*—Workman Nydegger

(57) ABSTRACT

Selectively applying graphical filtering to a portion of an object. One method described herein includes a method including accessing an object to be rendered. At least one characteristic of a portion of the object is determined. A filter is selected that has been pre-specified for the at least one determined characteristic. The filter is applied to the portion of the object, while not applying the filter to at least one other portion of the object.

18 Claims, 4 Drawing Sheets

U.S. PATENT DOCUMENTS

| | | | |
|---|---|---|---|
| 2005/0063082 A1* | 3/2005 | Davis | 359/889 |
| 2005/0159957 A1* | 7/2005 | Roth et al. | 704/276 |
| 2005/0249377 A1* | 11/2005 | Fouquet et al. | 382/103 |
| 2006/0188175 A1* | 8/2006 | Takiguchi et al. | 382/284 |
| 2007/0120833 A1* | 5/2007 | Yamaguchi et al. | 345/173 |
| 2007/0127056 A1* | 6/2007 | Hirano et al. | 358/1.14 |
| 2007/0162973 A1* | 7/2007 | Schneier et al. | 726/22 |
| 2007/0242290 A1* | 10/2007 | Misaizu et al. | 358/1.9 |
| 2007/0273689 A1* | 11/2007 | Tsao | 345/422 |
| 2007/0285729 A1* | 12/2007 | Wada | 358/3.15 |
| 2008/0002230 A1* | 1/2008 | Sakaue | 358/3.24 |
| 2008/0141134 A1* | 6/2008 | Miyazaki et al. | 715/716 |
| 2008/0263039 A1* | 10/2008 | Van Lunteren | 707/6 |
| 2008/0285069 A1* | 11/2008 | Yasuda | 358/1.15 |
| 2009/0019031 A1* | 1/2009 | Krovitz et al. | 707/5 |
| 2009/0213429 A1* | 8/2009 | Miyagi | 358/2.1 |

* cited by examiner

ADAPTIVE CONTEXTUAL FILTERING

BACKGROUND

Background and Relevant Art

Computers and computing systems have affected nearly every aspect of modern living. Computers are generally involved in work, recreation, healthcare, transportation, entertainment, household management, etc.

Computers generally include hardware which allows a computer to output visual representations of data to a user. For example, computers may include a video card connected to a CRT monitor or LCD video screen which allows objects including characters or other graphics to be displayed to the user. Similarly, many computers include the ability to interface with printers to provide visual representations of data on a hard copy for the user.

Additionally, depending on the nature of the visual representations to the users, certain filters may be applied to make the visual representations more appealing or more readable. The filters applied may be dependent on the visual representation. For example, LCD video screens are typically able to output data using a pixel resolution of about 110-130 pixels per inch. In contrast, printed representations can output data using a pixel resolution of the 300, 600 or even higher dots per inch. Different filters may be applied to the object if it is intended to be displayed on an LCD video screen than are applied to object if it is intended to be printed to a hard copy.

Generally, filters are applied on an object basis. For example, a filter may be applied to a graphic, character, icon, etc.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method including acts for selectively applying graphical filtering to a portion of an object. One method described herein includes a method including accessing an object to be rendered. At least one characteristic of a portion of the object is determined. A filter is selected that has been pre-specified for at least one determined characteristic For example the choice of a filter may be dependent on knowledge of structural, color, typographical or geometrical information. The filter is applied to the portion of the object, while not applying the filter to at least one other portion of the object.

Embodiments may include identifying characteristics such as the presence of various character features. For example, embodiments may identify structural information including typographical entities such as strokes, serifs, counter spaces, etc; geometrical entities and characteristics such as boundaries, connected components, skeletons, orientations, etc; and relations between entities such as distance and relative orientation. Embodiments may identify color information, including information related to foreground and background. Still other embodiments may identify user selections or zones of an object. Various filters may be applied including gray scaling, counter space improvement filtering, color improvement filters, etc.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

One embodiment illustrated herein allows filtering to be performed on a portion of an object as opposed to the entire object. A portion of an object may have certain characteristics for which a particular filter is appropriate while the filter is not appropriate or not useful for other portions of the object. Thus, a portion of an object with certain characteristics may be identified. A filter may then be selected, where the filter has been pre-defined as a filter appropriate for the characteristics. The filter is then applied to the portion corresponding to the characteristics. Further, other filters can be applied to other portions of an object. Thus, rather than a single filter being applied to an entire object, several different filters can be applied to different entities of an object or set of entities such as neighborhood entities that fall within a given threshold distance, as appropriate. For example, filters more appropriate to stems are only applied to stems, filters more appropriate to counter spaces are only applied to counter spaces, filters only appropriate to edges are only applied to edges, etc. For example, a filter may be specified for use with parts of two strokes where distance between the strokes falls below some pre-defined threshold value. The choice of a filter may be defined not only by an entity but by a relation between the entities or parts of the entities. In some embodiments, any or all of the forgoing may allow for "filter hinting" where filters can be suggested in a filter hinting language to facilitate rendering of objects.

Figure 1:
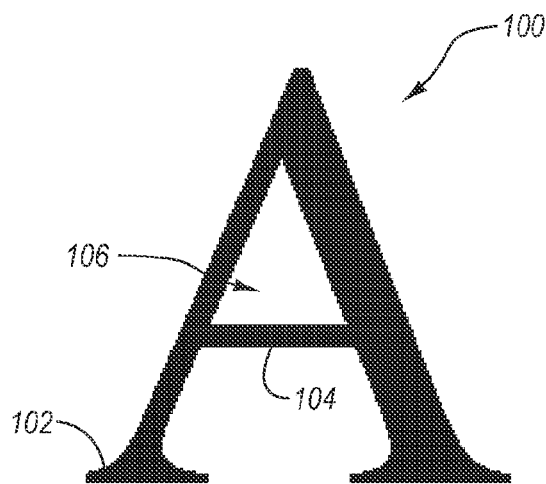
FIG. 1 illustrates an object.

Referring now to FIG. 1, an object 100 is illustrated. The object 100, in this particular example is a capital letter A. A computing system may have cause for outputting the capital letter A to a user in some graphical form. The object 100 may be displayed on a CRT or LCD display, sent to a virtual video card for remote desktop applications, printed to a hard copy for display to a user, or displayed in some other fashion. It may be desirable to apply one or more filters to the object 100 prior to displaying the object 100 to the user. These filters will often be dependent on the resolution of the medium on which the object is displayed, the size of the object 100, the proximity of the object 100 to other objects being displayed, the placement of the object on the display medium, and other factors.

Some of the filters that may be desirable to apply to the object 100 include traditional anti aliasing filters, ClearType® filters which utilize sub pixel components of an LCD screen to render different portions of the object on a sub pixel basis, gray scaling, and the like. These filters, when applied appropriately, can help to improve a viewer's perception of the object 100.

While in traditional applications of filters to objects, the application has been limited to a per object basis, embodiments described herein allow filters to be applied in a selective and contextual fashion. For example, filters may be applied to portion of an object without applying the filter to the entire object. Illustrating now an example, the object 100 includes a number of features. For example the object 100 includes serifs such as serif 102. The object 100 also includes a crossbar 104. FIG. 1 also illustrates that the object 100 includes an interior counter space 106. Objects may include stems, terminals, diagonals edges, or other features.

Certain filters may be more applicable to certain features than to other features. For example, a filter may be especially useful in improving the perception of serifs. Thus, in one embodiment, a portion of the object 100 which includes a serif, such as serif 102 may be identified. A characteristic of the portion may also be identified. In the present example, the characteristic is the presence of a serif in the portion. A filter has already been identified and pre-specified as especially useful in improving the perception of serifs. As such, the pre-specified filter is applied to the portion including the serif without applying the filter to at least one other portion of the object.

Figure 2A:
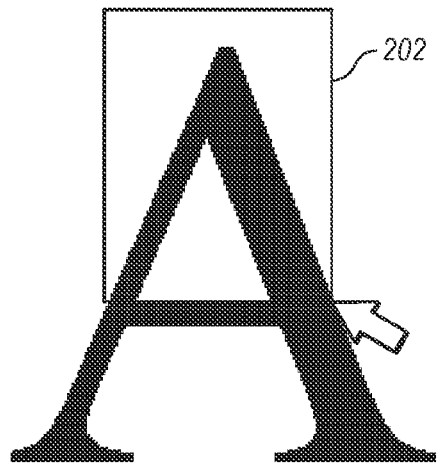
FIG. 2A illustrates a user selection box used to select a portion of an object.
Figure 2B:
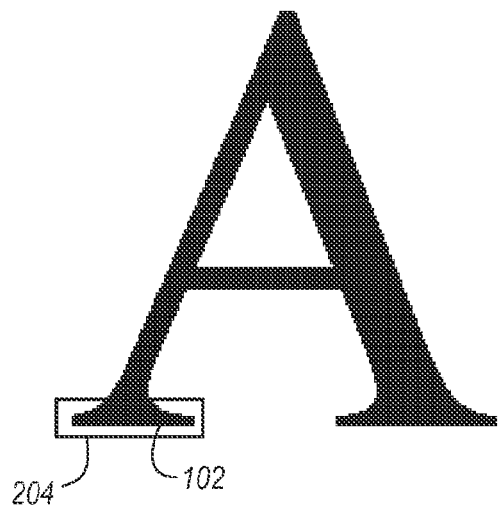
FIG. 2B illustrates selection of a portion of an object by identification of a character feature.
Figure 2C:
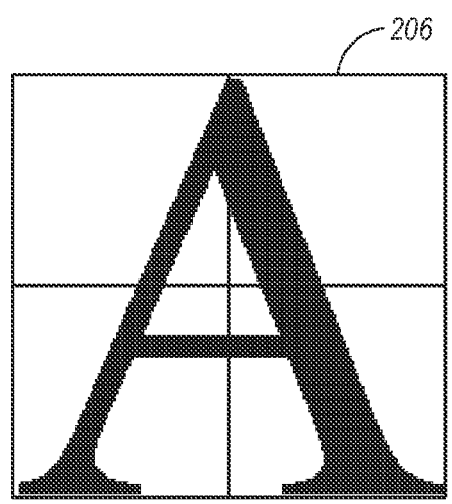
FIG. 2C illustrates selection of a portion of an object by selection of a zone of the object.

Referring now to FIGS. 2A-2C, a number of examples of how portions of objects may be identified and selected is illustrated. FIG. 2A illustrates that a portion of an object may be selected by user specification such as when a human user specifies a polygon which encompasses the portion of the object to which a particular filter should be applied. In the example shown in FIG. 2A, a select and drag indicator 202 shows the user specified polygon. However, other user specified input may also be used such as various sizable polygon shapes, textual coordinate specification, or any other appropriate specification.

Referring now to FIG. 2B, yet another example of specifying a portion of an object is illustrated. In the example shown in FIG. 2B, a feature of the object 100 is identified and the portion of the objects selected based on the identification of the feature. Illustratively, FIG. 2B shows that the serif 102 has been identified and that an identified portion 204 of the object 100 is the portion including the serif 102. Notably, other embodiments may include identifying other entities or characteristics. For example, embodiments may identify structural information including typographical entities such as strokes, serifs, counter spaces, etc; geometrical entities and characteristics such as boundaries, connected components, skeletons, orientations, etc; and relations between entities such as distance and relative orientation. Embodiments may identify color information, including information related to foreground and background.

For identifying definite characteristics of an object, certain information is associated with the object. For example, an object typically includes information regarding the immediate surroundings of the object. Further, additional information commonly used in science of visual perception, such as information related to a wider surrounding, viewing conditions, and characteristics of an output device, is generally required and assumed to be known as a function of being associated with an object. This information may influence which portions or entities of an object are identified and/or which filters are selected.

FIG. 2C illustrates yet another example of identifying a portion of an object by identifying a zone of the object. In FIG. 2C, the object 100 is divided into various quadrants. The portion of the object to which a filter is applied may be identified by quadrant. For example, the portion of the object may be identified as the upper right hand quadrant 206. While this example illustrates quadrants, it should be appreciated that in other examples other divisions of the object 100 may be implemented.

Embodiments may include various modalities and systems for accomplishing the selection of portions of objects. As illustrated, a human user may use various selection tools, such a graphical interfaces to accomplish graphical outlining, textual based selection such as coordinate definitions, etc to define portions of an object.

Figure 3A:
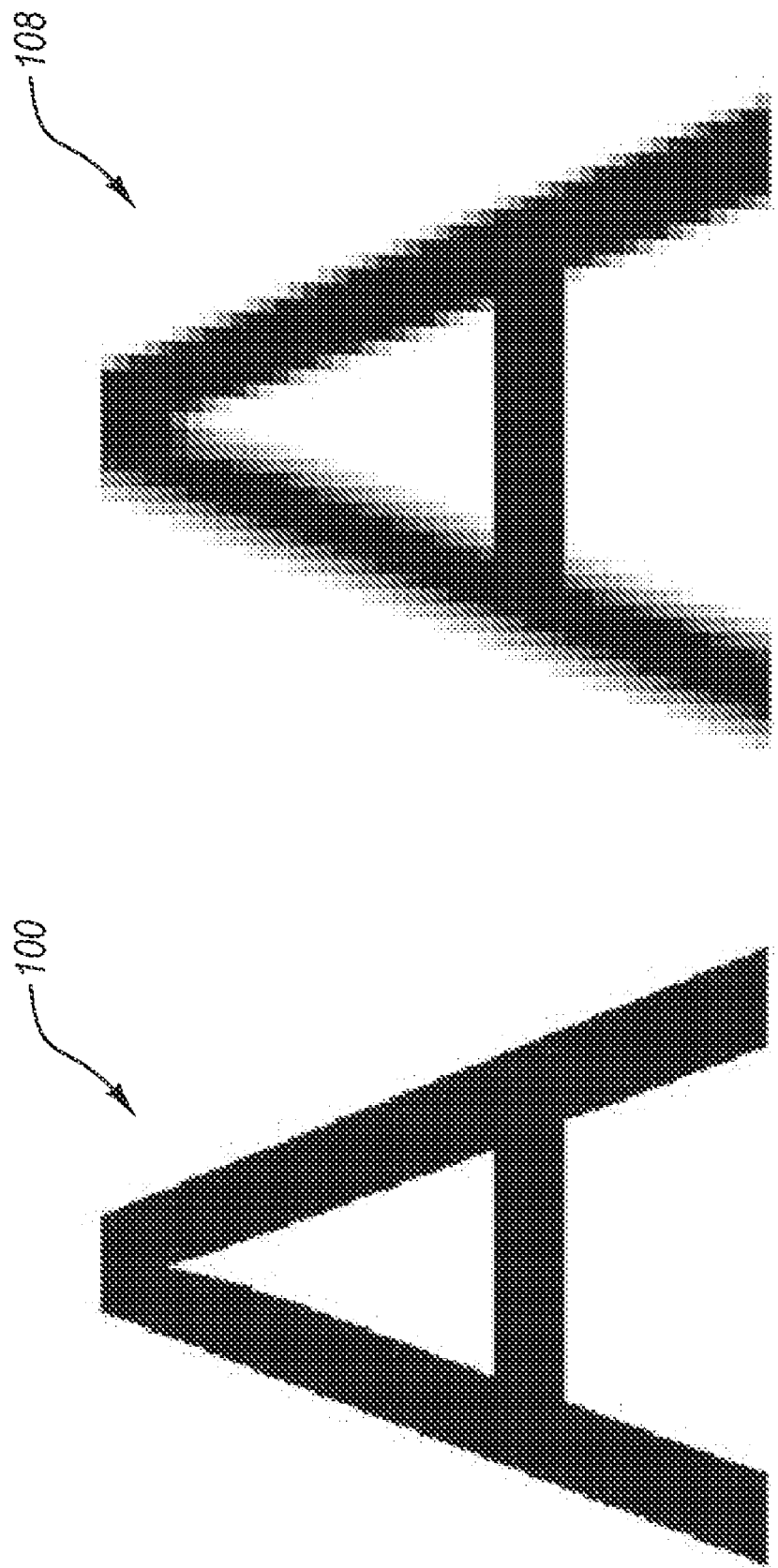
FIG. 3A illustrates application of antialiasing filtering a diagonal of an object.

In other embodiments, software routines may be used to define portions of an object. In one example, a software application may automatically without human intervention, select portions of an object. The selection may be accomplished through recognition of features or other rules that can be applied to an object. Referring now to FIG. 3A, one example of a filter is illustrated. It will be appreciated from the disclosure herein that filtering can be applied to a selected portion of an object. FIG. 3A illustrates an example of different anti-aliasing filters being applied to the left and right stems of the object 100 through the use of gray scaling resulting in an object 108 post filtering. A wider x-directional gray scaling filter is applied to the left stem than to the right stem resulting in a softer appearance of the left stem.

As illustrated in FIG. 3A, traditional filtering techniques such as gray scaling or ClearType filtering may be applied to a part of an object. Gray scaling shades pixels at the borders of characters using different shades of gray to create a perceived smoother edge. ClearType filtering, available from Microsoft Corporation of Redmond Wash., uses sub-pixel components, such as the red, green and blue sub-pixel components of pixels, to accomplish finer resolution anti-aliasing. In other embodiments, other types of filtering may be used depending on the desired effect.

For example, application of different types of filters to the different portions of an object may achieve a variety of desired visual effects. One such process of assigning color values may cause a geometric distortion, such as a slight shift in a feature, which may be beneficial to achieve higher contrast. Another filter color balances an object so that no one component is too blurry or too sharp. Another filter that may be applied uses color to denote hard or soft edges on a character. In particular, certain color palettes may be applied when there is a desire to indicate a hard edge while other color palettes may be applied when there is a desire to indicate a soft edge. One ultimate goal of filtering may be to define intensities of the primaries, or an equivalent characteristic, for the output image. Different filters can be applied for definition of different primaries. By introducing dependencies between filters for different primaries, resulting color palettes can be manipulated. Some filters may use different colors for portions of a character or object that are oriented in a particular fashion. For example, as between an upright portion or a slanted or oblique portion, more intense coloring may be used in oblique forms. In addition: Some filters may assign different colors for portions of a character or image that are in relation to another part of the character or a set of portions of object that fall within a set distance threshold.

One class of filters that may be applied includes applying filters which help to optimize interior counter spaces by keeping the interior counter spaces, such as interior counter space 106 shown in FIG. 1, open. This may be done in a number of different ways. In one embodiment, optimizing interior counter spaces may be accomplished by using color to create an optical illusion of additional space through manipulation of assigned color values to pixels in relation to entities or portions of an object.

Figure 3B:
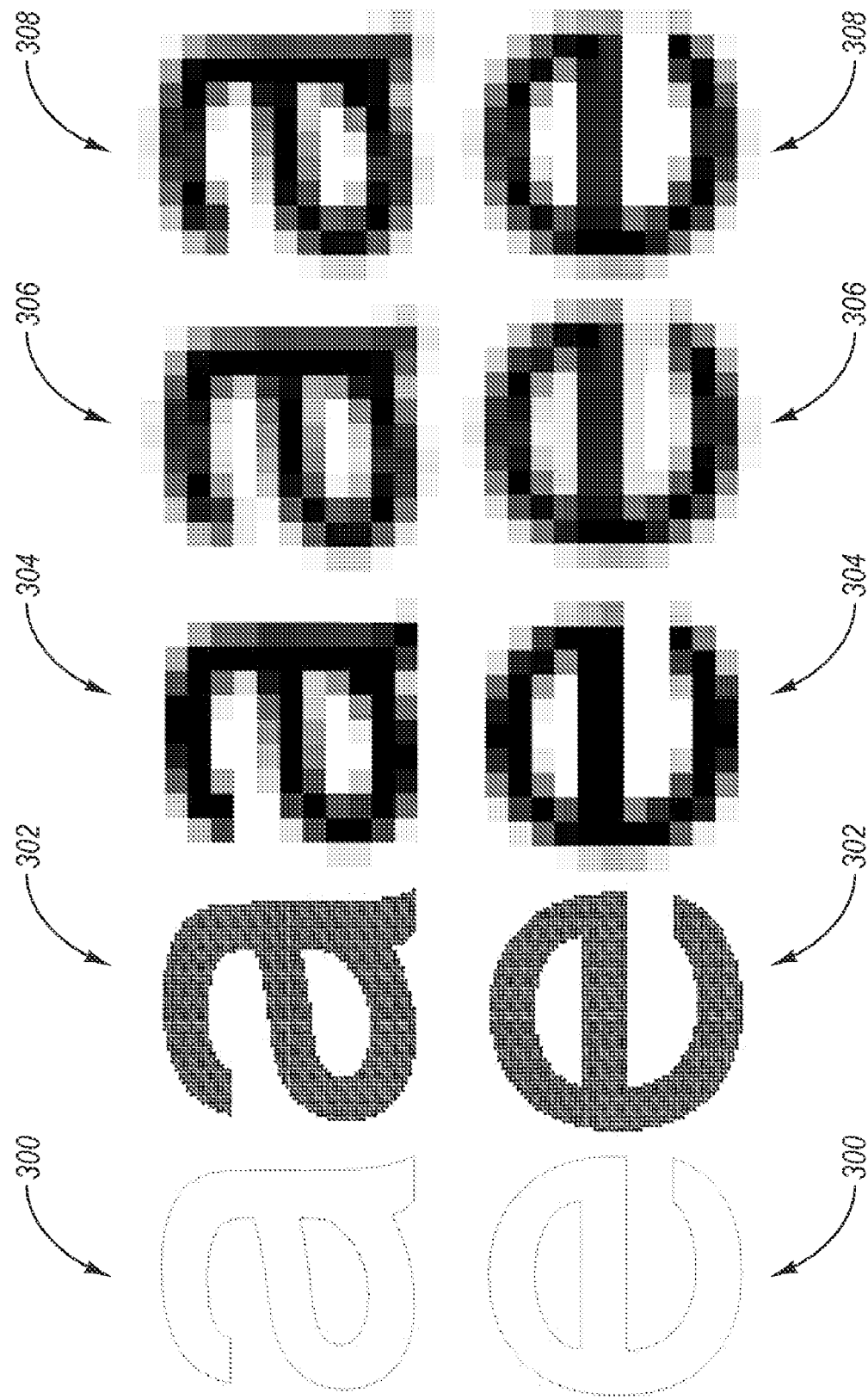
FIG. 3B illustrates examples of different filtering applied to objects and portions of objects.

Referring now to FIG. 3B, an example is illustrated where different filtering is applied to different portions of an object to create an overall better perception. FIG. 3B shows an example of adaptive filtering applied to two characters, "a" and "e". For each character, 300 illustrates an outline representation of the characters. At 302 an over-scaled bitmap with a 6×6 overscaling factor is shown. At 304, an example is illustrated where a single application of a narrower gray-scale filter is shown. At 306, the characters are shown as a result of an application of a wider gray-scale filter. The application of the wider filter results in a smoother appearance of the round strokes, but also visually closes counter-spaces, filling them with light shades of gray. Thus, to correct this, adaptive filtering can be applied as shown at 308 where a wider filter is applied to exterior curves of the character and a narrower filter is applied to the interior counter-spaces.

Some filtering is orientation dependent. For example, when applying coloring filters in x and y directions, filtering may be selected to optimize perceived contrast taking into account orientation sensitivity of a human eye. Additionally, perceived x and y shifts can be accomplished by using filtering which can cause an object to appear as being shifted. Thus, if there is a desire for a perceived shift to accomplish a desirable spacing, certain filters can be applied to cause the perceived shift. This may be useful to control perceived spacing for parts of a single character, or to control perceived character to character spacing.

Other filters may be applied based on other specific portions of an object. For example, some filtering may be particularly appropriate for a given structural entity or characteristic. For example, it is often desirable for stokes to appear continuous. For example, it is desirable that perceptible breaks in a stroke be minimized. Thus, a filter make be applied to a stroke portion of an object, where the filter optimizes the perceived continuity of the stroke.

Still other filters may be applied to compensate for physiological perception characteristics in human or other species observers. For example, filters may be applied to minimize perceived colorfulness. Additionally, filters may be applied based on specific observer characteristics. For example, some human users may suffer from dichromatic vision, also known as colorblindness. For these users, different filters may be applied than what would be applied for users with trichromatic vision.

Additionally, other filters may be applied to facilitate better recognition of characters or words. Specifically, it has been shown that certain spacing or delimiters help to facilitate character and word recognition. Further, it can be shown that certain imperfections in character rendering are more detrimental than other imperfections in character or word recognition. As such, a filter can be applied to facilitate character or word recognition. In one embodiment, a filter applies given spacings or delimiters to an object. In another embodiment, in situations where some loss of fidelity to the original design is unavoidable, usually due to a limited resolution of an output device, adaptive choice of filters helps to ensure that parts of characters more important for the human recognition will be rendered with higher fidelity than those less important for recognition.

Figure 4:
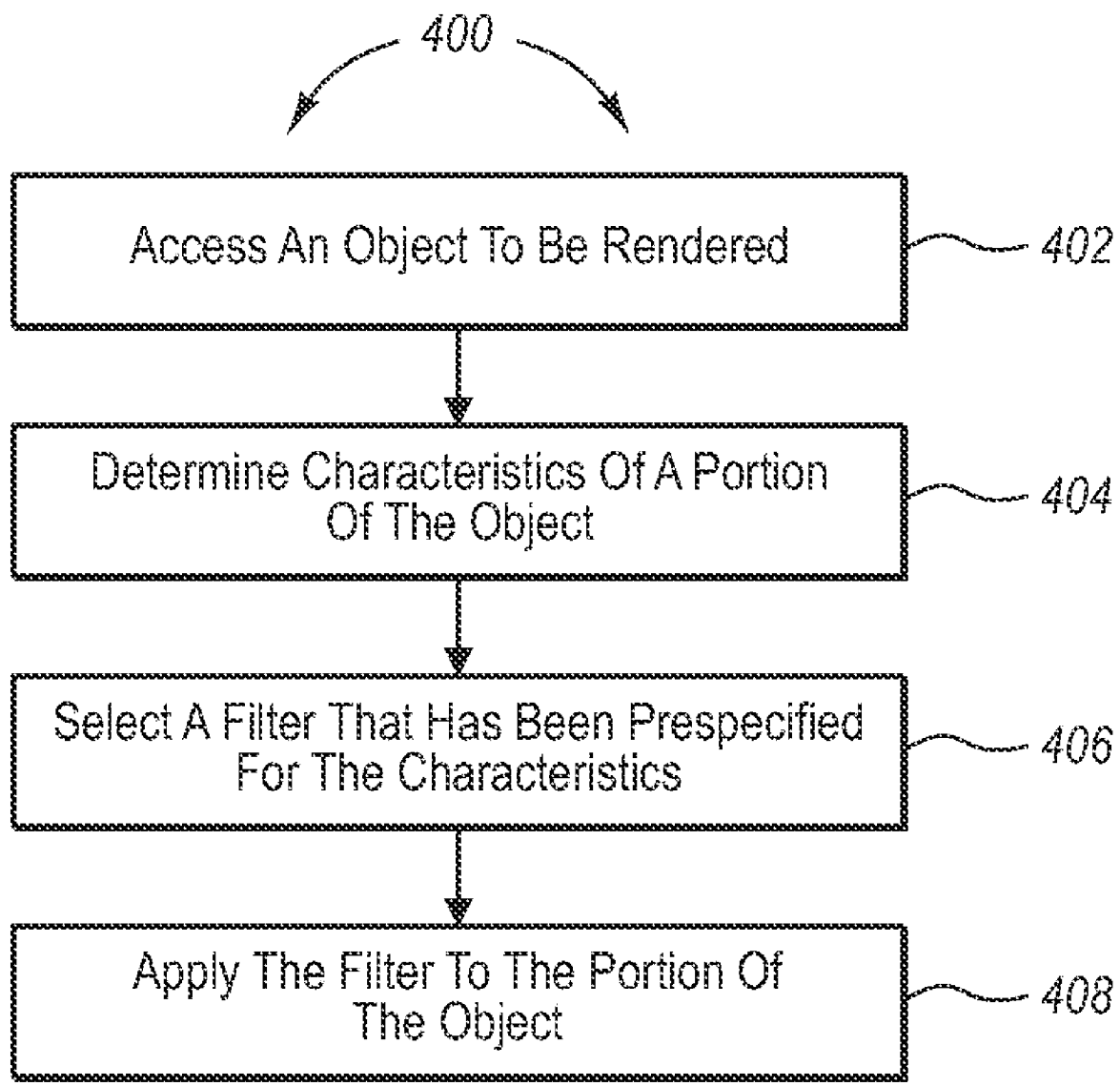
FIG. 4 illustrates a method of selectively applying filters to different portions of an object.

Referring now to FIG. 4, a method 400 of applying filters is illustrated. The method 400 includes accessing an object to be rendered (act 402). For example, the object 100 illustrated in FIG. 3A may be accessed to be rendered to a video screen, virtual video card for remote desktop application, printed page, or some other rendering of the object 100.

FIG. 4 further illustrates an act of determining characteristics of a portion of the object (act 404). For example, characteristics may include that a portion is a user selected portion. For example, FIG. 2A illustrates a user selection of a portion of an object 100. In another embodiment, characteristics of an object may include the presence of typographical features such as a serif, stroke, stem, crossbar, edge, diagonal, etc. For example, FIG. 2b illustrates that the portion 204 of the object 100 includes a serif 102. The inclusion of a serif may be a characteristic. The characteristic may be the presence of open or interior counter spaces, such as the counter space 106. The characteristic may be that the portion of the object exists within a particular pre-specified region of the object. For example, FIG. 2C illustrates that an object 100 is divided into quadrants. The characteristic of portion 206 may be that it includes the upper right hand quadrant. Any other suitable characteristic of a portion of an object may alternatively be used.

The method 400 further includes selecting a filter that has been pre-specified for the characteristics (act 406). In one embodiment, the characteristic may be specified by a user for a particular portion, such as when the portion is selected by a user. Various other filters may be selected. For example, in one embodiment, when the characteristic is the presence of open or interior counter spaces, a filter may be selected which causes the counter space to be perceived as more open. For edges, filters that define the edges as hard or soft, as appropriate may be selected. Other continuity, coloring, or other filters may be applied as appropriate. As illustrated previously, any one of a number of different filters may be selected for a particular characteristic. Notably, the filters selected may be have been pre-specified for the particular characteristic and may be specified, for example, in a filter hinting language defining which filters should be applied for a particular characteristic. The selected filter is then applied to the portion of the object (act 408).

As noted previously, different filters may be applied to different portions of an object before an object is output to a user. For example, one filter may be applied to portions including counter spaces on a character, but not applied to portions including diagonals, or serifs. Another filter may be applied to portions including diagonals but not to other portions. Still another filter may be applied only to portions of the object including serifs. An object can then be output using a composite filter including individual filters where each individual filter of the composite filter operates on some portion of an object, but not other portions of the object.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computing system having a processor of selectively applying graphical filtering to a portion of a character, the method comprising:
   a) accessing a character to be rendered;
   b) identifying a limited portion of the character, the limited portion of the character consisting of less than the entire character and being defined by a particular characteristic, the particular characteristic comprising one or more of a structural, chromatic, typographical or geometrical characteristic corresponding to the limited portion of the character;
   c) selecting a filter that has been pre-specified for the particular characteristic, based at least in part on a hinting language definition associated with the character;
   d) applying the filter to the limited portion of the character, while refraining from applying the filter to the entire character, and
   e) applying an additional filter that has been pre-specified for another characteristic of a different limited portion of the character to the different limited portion of the character and while refraining from applying the additional filter to the entire character,
   wherein the filter applied to the limited portion of the character comprises a relatively wide gray-scale filter as compared to the additional filter comprising a relatively narrow gray-scale filter.

2. The method of claim 1, wherein the particular characteristic comprises a typographical characteristic.

3. The method recited in claim 2, wherein the particular characteristic is defined as either a stroke, a serif or a counter space corresponding to the character.

4. The method of claim 1, wherein the particular characteristic comprises a geometrical characteristic.

5. The method of claim 4, wherein the geometrical characteristic comprises a distance between strokes.

6. The method of claim 1, wherein the particular characteristic is defined by a user selection.

7. The method of claim 1, wherein identifying the limited portion of the character comprises identifying a zone of the object.

8. The method of claim 1, wherein the filter is pre-selected by human determination.

9. The method of claim 1, wherein the filter is pre-specified in a filter hinting language.

10. The method of claim 9, wherein the filter is specified within the filter hinting language by human interaction.

11. The method of claim 1, further comprising repeating acts b through d for other characteristics before displaying the character to a user.

12. The method of claim 1, wherein the filter includes parameters directed to models of human visual perception.

13. The method of claim 12, wherein the filter includes parameters directed to models of human visual perception that are based on a distinction between dichromatic visual perception and trichromatic visual perception.

14. The method of claim 1, wherein the filter includes parameters directed to human recognition specific to a class of objects.

15. The method recited in claim 1, wherein the limited portion of the character comprises exterior curves of the character, to which the relatively wide gray-scale filter is applied, and wherein the different limited portion of the character comprises interior counter spaces of the character, to which the relatively narrow gray-scale filter is applied.

16. The method recited in claim 1, wherein the particular characteristic is a typographical characteristic comprising one of a serif, a stroke, a stem and a diagonal and such that identifying the limited portion of the character includes distinguishing between at least said serif, stroke, stem or diagonal, and wherein the method further includes selecting the filter to be applied to the limited portion of the character based at least in part on whether the particular characteristic is distinguished to be said serif, stroke, stem or diagonal.

17. In a computing environment, a computer readable medium comprising computer executable instructions that when executed by a processor cause the following to be performed:
   a) accessing a character to be rendered;
   b) identifying a limited portion of the character, the limited portion of the character consisting of less than the entire character and being defined by a particular characteristic, the particular characteristic comprising one or more of a structural, chromatic, typographical or geometrical characteristic corresponding to the limited portion of the character;
   c) selecting a filter that has been pre-specified for the particular characteristic, based at least in part on a hinting language definition associated with the character;

d) applying the filter to the limited portion of the character, while refraining from applying the filter to the entire character, and
e) applying an additional filter that has been pre-specified for another characteristic of a different limited portion of the character to the different limited portion of the character and while refraining from applying the additional filter to the entire character,
wherein the filter applied to the limited portion of the character comprises a relatively wide gray-scale filter as compared to the additional filter comprising a relatively narrow gray-scale filter.

18. A computing system comprising:
a processor;
a memory coupled to the processor, wherein the memory comprises computer executable instructions that when executed by the processor cause the following to be performed:
  a) accessing a character to be rendered;
  b) identifying a limited portion of the character, the limited portion of the character consisting of less than the entire character and being defined by a particular characteristic, the particular characteristic comprising one or more of a structural, chromatic, typographical or geometrical characteristic corresponding to the limited portion of the character;
  c) selecting a filter that has been pre-specified for the particular characteristic, based at least in part on a hinting language definition associated with the character;
  d) applying the filter to the limited portion of the character, while refraining from applying the filter to the entire character, and
  e) applying an additional filter that has been pre-specified for another characteristic of a different limited portion of the character to the different limited portion of the character and while refraining from applying the additional filter to the entire character,
wherein the filter applied to the limited portion of the character comprises a relatively wide gray-scale filter as compared to the additional filter comprising a relatively narrow gray-scale filter.

* * * * *